United States Patent Office 3,337,161
Patented Aug. 22, 1967

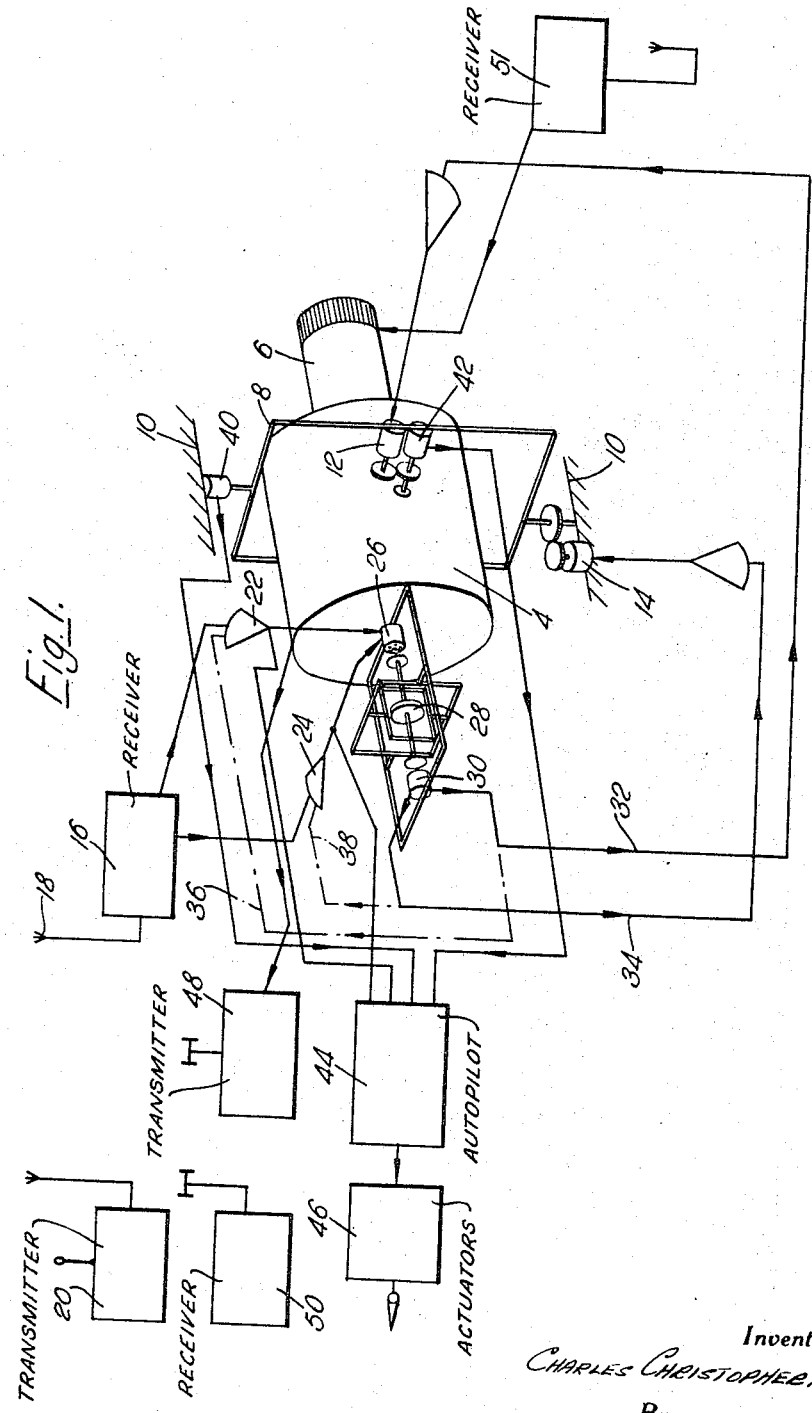

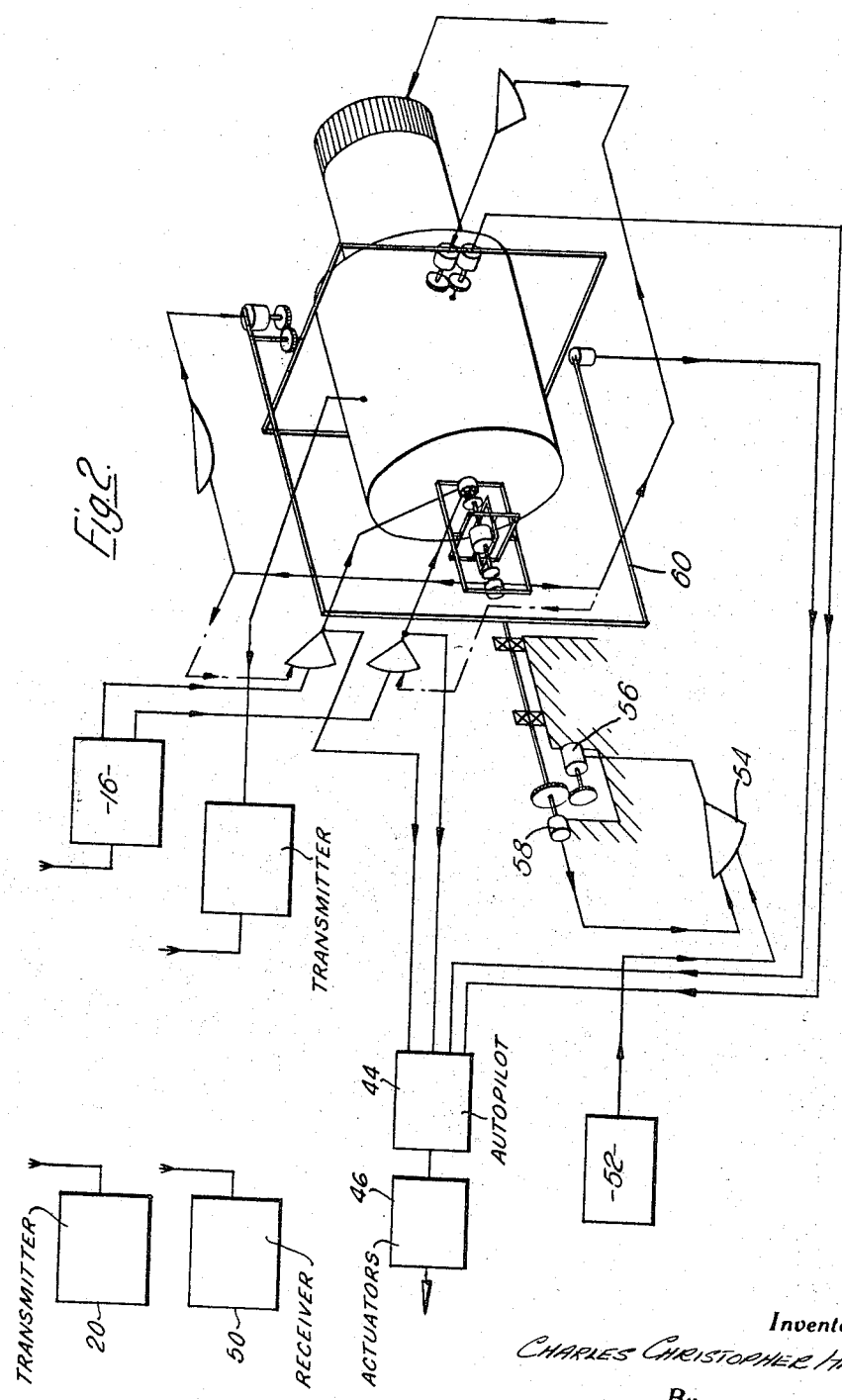

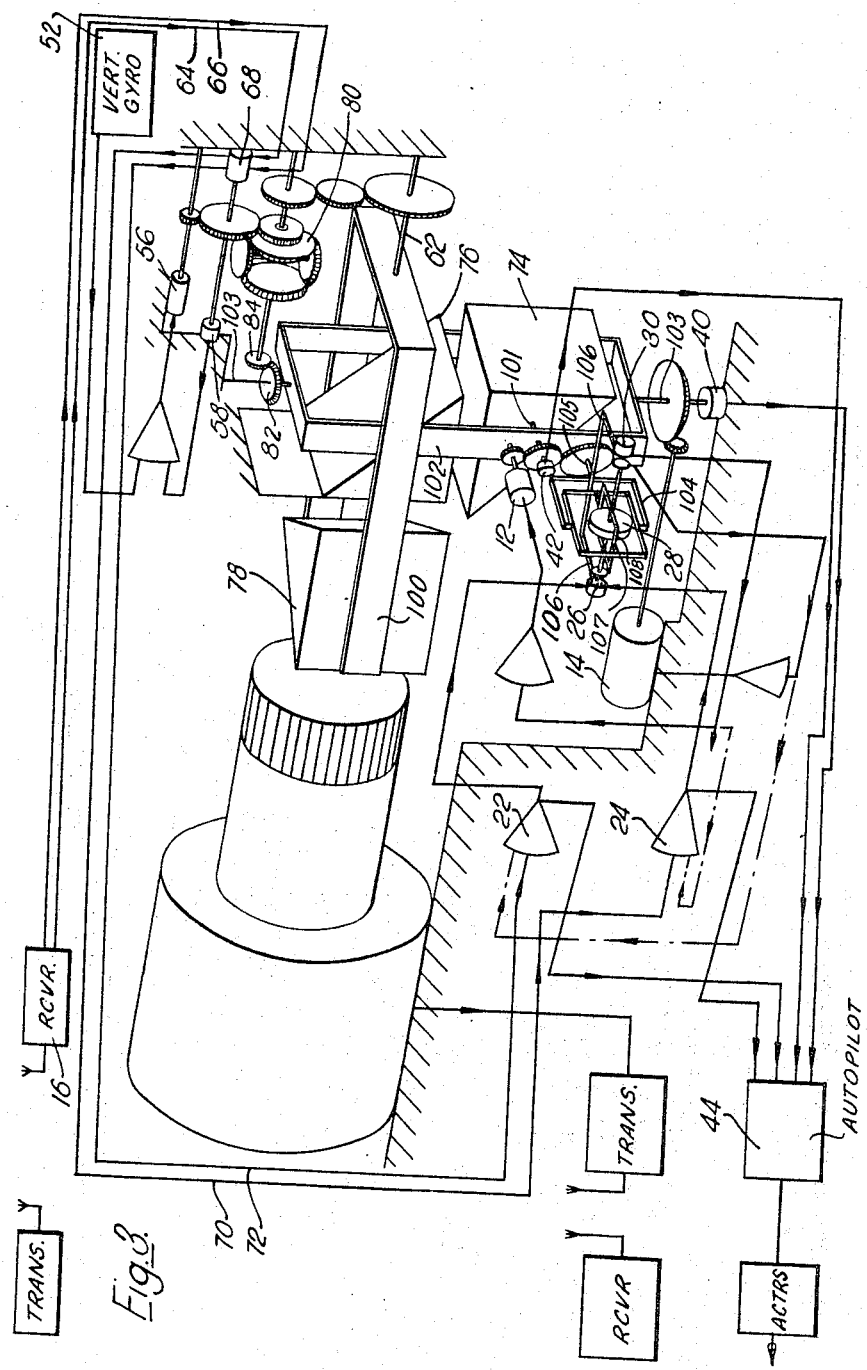

3,337,161
RADIO CONTROLLED MISSILE WITH
TELEVISION CAMERA
Charles Christopher Halton, London, England, assignor to British Aircraft Corporation (Operating) Limited, London, England, a British company
Continuation of application Ser. No. 224,888, Sept. 17, 1962. This application Mar. 23, 1966, Ser. No. 536,856
Claims priority, application Great Britain, Sept. 22, 1961, 34,109/61
2 Claims. (Cl. 244—3.14)

This is a continuation of application Ser. No. 224,888, filed Sept. 17, 1962, now abandoned.

This invention relates to navigation systems for air-to-surface guided weapons.

It has been proposed to launch a missile from an aircraft and to provide in the aircraft guidance means which radiates a signal which is picked up by the missile and which controls the flight of the missile by means of servo devices in the latter.

According to the present invention, a television camera head is mounted in the missile together with means for angularly adjusting the sight line of the camera head relative to the missile structure, thereby enabling the field a view of the camera head to be adjusted and means are provided for applying signals representing the pitch and yaw angles of the sight line, relative to the missile, to an autopilot, so that the missile can be made to fly into the sight line of the camera, when required. In a command guidance system, the missile may also have a television transmitter for transmitting a radio frequency signal including the video information provided by the camera head.

The provision of a rotatable camera sight line enables the operator at the control station to have a very wide field of view without having to steer the missile as a whole. If a fixed sight line were used, a wider terrain than that immediately in front of the missile could be scanned by giving the missile a corkscrew motion. However, this would require a high degree of skill on the part of the operator, who may be within an aircraft, and accuracy would be difficult to achieve. The principal reason for this is the slow aerodynamic response of the missile, which renders it difficult to avoid oversteering the missile. Additionally, the aircraft may be executing severe aerodynamic manoeuvres during the guidance of the missile. With a rotatable sight line the problem of oversteering does not arise and a complete scan of the terrain can be provided in a short period.

Additionally, the missile-launching aircraft may be provided with radar apparatus for providing a P.P.I. display within the aircraft. This has the advantage that it enables the missile to be launched some distance from the proposed target and also permits easier guidance of the missile during its mid-course.

Thus, after the launching of the missile from the aircraft, the P.P.I. display may be used to guide the missile until it reaches the vicinity of the target, after which the missile operator can use the television display, rotating the sight line in the missile as required. When the target has been located a zoom lens system may be employed to provide amplification of a much smaller area of the terrain. The zoom lens system is also applicable to simpler systems where the sight line is at a fixed angle relative to the missile axis, or is parallel thereto.

Information on target movement relative to the sight line can be obtained manually by the operator inspecting his monitor screen or by the use of automatic or semi-automatic tracking in either missile or aircraft. Thus, once the target has been recognised, the sight line can be kept pointing at the target. Suitable "pick-offs" in the missile used in conjunction with a nulling servo system then cause the missile to steer into the direction of the camera sight line and hence intercept the target.

In order that the invention may be better understood several examples employing command guidance will now be described with reference to the accompanying drawings, in which:

FIGURE 1 illustrates diagrammatically a camera control system suitable for use in a roll-stabilised missile;

FIGURE 2 shows a camera control system including independent roll stabilisation; and FIGURE 3 illustrates a further alternative in which the camera is fixe relative to the missile and is associated with an optical system, which is freely rotatable.

In FIGURE 1 the television camera 4, provided with a zoom lens 6, is mounted with freedom in two axes in gimbals 8 which are connected to the missile structure 10, the roll axis being locked relative to the missile which in this example is roll-stabilised. A servo motor 12 is arranged to cause angular movement of the camera in the pitching plane and a servo motor 14 causes angular movement of the camera in the yawing plane.

A camera control receiver 16 receives through antenna 18, signals from control transmitter 20 in the aircraft from which the missile is launched. These signals represent the required pitching and yawing movements of the camera and are applied through amplifiers 22 and 24 to a torque motor unit 26 associated with a gyro 28 in a "bootstrap" gyro system, i.e. a system in which a given axis of an object free to rotate with respect to space is stabilised by moving the gyro spin axis with respect to space by torque motors fixed to the gyro casing and deriving from the deviation between the casing (or object) and the spin axis a signal which is used to move the object until the signal is reduced to zero. The four poles of the torque motor unit 26, which are angularly spaced about the axis of the latter, co-operate across a narrow gap with a disc mounted on the inner gimbal ring and coaxial with the gyro spin axis. The four poles of an associated pick-off unit 30 are similarly arranged with respect to another disc mounted on the inner gimbal ring on the opposite side of the rotor. Signals from amplifier 22 energise one pair of poles of the torque motor system, resulting in angular movement of the rotor axis and the generation of pitch-demand signals in the corersponding pair of poles of the pick-off unit 30. Signals from amplifier 24 energise the other pair of poles of the unit 26 and cause yaw-demand signals to be generated by the pick-off unit 30. These signals from the pick-off unit 30 are applied by way of conductors 32 and 34 to the pitch and yaw servos 12 and 14, respectively.

To eliminate lags in the system, the gyro pick-off signal can also be used to feed back against the signals from the camera control receiver 16 prior to the torque motor 26. The necessary connections 36 and 38 from the pick-off 30 to the amplifiers 22 and 24, respectively, are shown in dotted lines. The signal from the camera control receiver can then be used as a measure of rate of turn of the sight line vector and the missile can operate using a proportional navigation system.

Pick-offs 40 and 42 are associated with the gimbals and provide signals representing the gimbal angles. These are applied to the electronic system 44 of the autopilot, which controls the control surface actuators 46. However, as stated previously, these pick-offs are only brought into use when the target has been recognised. In the mid-course phase of flight, the missile may be steered by command with reference to the P.P.I. display, the course-correction demand signals being applied directly to the auto-pilot by way of the connections from the amplifiers 22 and 24 to the autopilot 44. On approaching the target zone, the operator uses the television display to rotate the sight line in the missile, and the autopilot maintains a steady course, this mode of operation continuing until the target is recognised.

The output of the television camera 4 is applied to a television transmitter 48 in the missile. The signals broadcast from this transmitter are received by the receiver 50 in the aircraft.

The zoom lens is controlled from a control unit 51 receiving signals from the aircraft.

As stated above the arrangement shown in FIGURE 1 is suitable for use in a missile which is roll-position stabilised. If, however, stabilisation of the roll position of the missile is impossible or undesirable for some reason, the apparatus shown in FIGURE 2 can be used.

FIGURE 2 shows a camera control system which is generally similar to that illustrated in FIGURE 1, but in which the camera is mounted with freedom in three axes and which includes a vertical gyro 52, the output of which is applied through an amplifier 54 to a servo motor 56 in a follow-up system, the feedback signal being derived from the pick-off 58 and applied to the amplifier 54 against the roll output signal from the gyro. The servo motor 56 rotates the frame 60 containing the camera pitch and yaw devices and the bootstrap gyro.

As an alternative to the roll-control system of FIGURE 2, the field coils around the camera tube can be rotated to rotate the raster within the tube.

FIGURE 3 shows a modified form of apparatus in which the television camera is fixed with respect to the missile structure whilst the zoom lens is optically associated with a mirror system which is roll-stabilised but has freedom in pitch and yaw to respond to signals from the operator in the aircraft. In this case, the output of the vertical gyro 52 is applied to the servo motor 56 which drives, through a succession of gears, a roll shaft 62, on which is mounted a frame 100 within which is fixed a right-angled prism 78. The light beams are incident on one 45° face of the prism 78 and emerge through the other 45° face, the image formed by the light beams having been "inverted" by the prism. Rotation of the prism rotates the image at twice the rate of rotation of the prism. As in the case of FIGURE 2, a pick-off 58 provides a signal which is fed back against the output of the gyro 52. The signals from the camera control receiver, which indicate the required pitching and yawing movements of the optical system, are applied over conductors 64 and 66 to a synchro resolver 68, the shaft of which is adjusted by the roll servo 56. The resolver thus provides pitching and yawing signals which take into account the angle of roll of the optical system. These signals are applied by way of conductors 70 and 72 to the amplifiers 22 and 24 which drive the gyro torque motor 26. The gyro pick-off 30 provides signals which, as in the case of FIGURES 1 and 2, are applied through amplifiers to the pitch and yaw servo motors 12 and 14. The motor 12 drives a shaft 101 which passes through a frame 102 and on which is mounted a prism 74. The prism 74 is thus rotated in pitch with respect to the frame 102 by the motor 12. The motor 14 drives the vertical shaft 103 on which the frame 102 is mounted, and thus rotates both the frame 102 and the prism 74 in the yaw sense. Each of the prisms 74 and 76 reflects axial light through a right-angle, the light from the prism 76 travelling through an anti-roll prism 78 along the optical axis of the camera. The prism 76 is fixed with respect to the missile structure. The gyro 28 is mounted in inner gimbal frames 107 and 108, the frame 107 being connected to a frame 104 which is mounted on a shaft 105 geared to the shaft 101. Outriggers 106 attached to the frame 104 support the pick-offs 30 and torque motors 26. Also as in the case of FIGURES 1 and 2, the pitch and yaw pick-offs 42 and 40 provide signals which are applied to the electronic system 44 of the autopilot.

The anti-roll prism 78 rotates the picture about the camera's longitudinal axis in response to two signals, the angular movements produced by these signals being added in a differential 80. One of these signals is a correction signal for the movement of prism 74 in the yaw sense and is made necessary by the fact that relative rotation between prisms 74 and 76 about a vertical axis causes rotation in roll of the picture (about the camera longitudinal axis). This rotary movement is applied to the differential through the gears 82 and 84. The other signal is that derived from the roll-position gyro 52 and it provides roll-stabilisation of the display, which will be required, for example, in a missile of the "twist-and-steer" kind. The differential maintains an accurate 2:1 reduction between the angular movements of the yaw prism 74 and the anti-roll prism 78.

The reason for the use of the resolver 68 in FIGURE 3 is that it is desirable that movement of the stick controlling the camera and the resultant motion of the display on the monitor screen should be correlated. That is, movements of the control stick in a particular direction should always cause the display to move in the corresponding direction; for example, fore-and-aft movement of the stick producing up and down movement of the display. This means that the axes of rotation of the foresight of the camera must be fixed with respect to the camera.

This is achieved in FIGURE 2 by moving the camera directly in response to signal from the bootstrap gyro; that is, movement of the control stick in a fore-and-aft direction always causes the gyro rotor to precess about its inner gimbal axis. The follow-up servos on the camera gimbals always try to reduce to zero the angle between the camera axis and the gyro spin axis, and hence the effect is that the camera is rotated about the gyro's inner gimbal axis. This axis remains fixed with respect to the camera and hence movement of the stick in a given direction always causes the camera to rotate about a corresponding axis fixed with respect to itself.

In the case of FIGURE 3 this is not achieved because the foresight is not defined by the camera axis but by the yaw prism 74. This means that, for proper operation, the bootstrap gyro must be fixed to the yaw prism rather than the camera itself. However, roll stabilisation of the display is introduced, by the anti-roll prism 78, between the camera and the bootstrap gyro (that is, the camera itself is not stabilised) and hence there is a relative rotation of axes between the bootstrap gyro and the display. This means that for correlation between stick and display, the stick demands must be rotated by resolver 68 through the same angle before being applied to the bootstrap gyro torque motors.

Although in the above examples the sight-line is mechanically rotated, it would obviously be possible by suitable electron beam deflection means to move the sight-line angularly by electronic means.

In addition, the invention is not confined to missile systems in which the sight-line of the camera is manually rotated by an operator in a control station or aircraft, but could also be used in semi-automatic and fully automatic systems, i.e. systems in which the target is illuminated by a transmission from a ground or aircraft station or from the missile itself and in which a computer located on the missile computes the required homing signals in response to signals reflected from the target.

I claim:

1. A guided missile stabilised against spin comprising: a missile body structure; a television camera head mounted in and fixed relative to said missile structure to provide an image of objects external to said missile; an angularly adjustable optical system positioned in front of said camera head; said optical system including a first reflecting device mounted for angular movement about two mutually perpendicular axes to move said image in pitch and yaw and which in its zero position of pitch and yaw has an optical axis parallel to but offset with respect to the optical axis of said camera head, and a further reflecting device fixed with respect to the missile body structure for reflecting light from the first reflecting device along the optical axis of said camera head; a roll prism between said first reflecting device and said camera head and rotatable about the optical axis of said camera head to rotate said image in roll; means for rotating said roll prism about the optical axis of said camera head through an angle which is the algebraic sum of the angle of roll of said missile structure and one half of the angle of rotation of said further reflecting device about its yaw axis; an auto-pilot, and means for feeding to said auto-pilot signals corresponding to the pitch and yaw of the adjustable optical system relative to said missile body structure, whereby said missile can be made to fly into the sight line of the adjustable optical system.

2. A missile according to claim 1, including driving means for rotating said second prism in pitch and yaw, a resolver receiving signals representing required pitch and yaw angles of said image and applying pitch and yaw output signals to said driving means, and means responsive to the angle of roll of said missile structure to adjust the axis of resolution of said resolver.

References Cited

UNITED STATES PATENTS

| | | | |
|---|---|---|---|
| 784,852 | 3/1905 | Goerz | 350—23 |
| 1,524,788 | 2/1925 | Gardner | 88—1 |
| 2,441,036 | 5/1948 | Schade | 340—23 X |
| 2,869,803 | 1/1959 | McGee | 244—3.11 |
| 2,935,942 | 5/1960 | De Young et al. | 244—3.16 X |
| 2,959,375 | 11/1960 | Dunnegan | 244—3.14 |
| 2,963,543 | 12/1960 | Link et al. | 178—6.8 |
| 3,035,477 | 5/1962 | Ten Bosch et al. | 88—1 |
| 3,057,953 | 10/1962 | Guerth. | |

BENJAMIN A. BORCHELT, *Primary Examiner.*

W. C. ROCH, *Assistant Examiner.*